US010341404B2

(12) United States Patent
Zuckerberg et al.

(10) Patent No.: US 10,341,404 B2
(45) Date of Patent: *Jul. 2, 2019

(54) DYNAMICALLY UPDATING MEDIA CONTENT FOR DISPLAY TO A USER OF A SOCIAL NETWORK ENVIRONMENT BASED ON USER INTERACTIONS

(71) Applicant: Facebook, Inc., Menlo Park, CA (US)

(72) Inventors: Mark E. Zuckerberg, Palo Alto, CA (US); Andrew G. Bosworth, Palo Alto, CA (US); Chris Cox, Palo Alto, CA (US); Ruchi Sanghvi, Palo Alto, CA (US); Matthew Cahill, Redwood City, CA (US)

(73) Assignee: Facebook, Inc., Menlo Park, CA (US)

( * ) Notice: Subject to any disclaimer, the term of this patent is extended or adjusted under 35 U.S.C. 154(b) by 245 days.

This patent is subject to a terminal disclaimer.

(21) Appl. No.: 13/846,876

(22) Filed: Mar. 18, 2013

(65) Prior Publication Data

US 2013/0212495 A1  Aug. 15, 2013

Related U.S. Application Data

(63) Continuation of application No. 13/615,253, filed on Sep. 13, 2012, now Pat. No. 8,412,821, which is a (Continued)

(51) Int. Cl.
*H04L 29/06* (2006.01)
*G06Q 30/02* (2012.01)
(Continued)

(52) U.S. Cl.
CPC .......... *H04L 65/601* (2013.01); *G06Q 30/02* (2013.01); *H04L 65/40* (2013.01); *H04L 67/02* (2013.01);
(Continued)

(58) Field of Classification Search
CPC .......... G06F 17/30867; G06F 17/3053; G06F 17/30699; G06F 17/30705; G06F 17/3089; G06F 16/9535; H04L 65/601

See application file for complete search history.

(56) References Cited

U.S. PATENT DOCUMENTS 6,266,649 B1 * 7/2001 Linden ............. G06Q 10/08345
705/14.51
7,610,287 B1  10/2009 Dean et al.
(Continued)

FOREIGN PATENT DOCUMENTS

JP  2002-245212 A  8/2002

OTHER PUBLICATIONS

European Patent Office, Examination Report, European Patent Application No. 07836589.7, Aug. 30, 2013, four pages.
(Continued)

*Primary Examiner* — Sherrod L Keaton
(74) *Attorney, Agent, or Firm* — Fenwick & West LLP

(57) ABSTRACT

A system and method provides dynamically selected media content to someone using an electronic device in a social network environment. Items of media content are selected for the user based on his or her relationships with one or more other users. The user's relationships with other users are reflected in the selected media content and its format. An order is assigned to the items of media content, for example, based on their anticipated importance to the user, and the items of media content are displayed to the user in the assigned order. The user may change the order of the items of media content. The user's interactions with media content available in the social network environment are monitored, and those interactions are used to select additional items of media content for the user.

18 Claims, 5 Drawing Sheets

Related U.S. Application Data continuation of application No. 13/448,157, filed on Apr. 16, 2012, now Pat. No. 8,312,140, which is a continuation of application No. 11/503,037, filed on Aug. 11, 2006, now Pat. No. 8,171,128.

(51) Int. Cl.
*H04L 29/08* (2006.01)
*G06F 16/335* (2019.01)
*G06F 16/9535* (2019.01)

(52) U.S. Cl.
CPC ............ *H04L 67/22* (2013.01); *H04L 67/306* (2013.01); *G06F 16/335* (2019.01); *G06F 16/9535* (2019.01)

(56) References Cited

U.S. PATENT DOCUMENTS

| | | | |
|---|---|---|---|
| 7,664,735 B2 | 2/2010 | Zhang et al. | |
| 7,734,632 B2 * | 6/2010 | Wang | G06Q 30/02 707/749 |
| 7,818,392 B1 * | 10/2010 | Martino | G06Q 10/10 709/217 |
| 7,890,871 B2 | 2/2011 | Etkin | |
| 8,229,951 B2 | 7/2012 | Nickell et al. | |
| 8,521,787 B2 | 8/2013 | Bosworth et al. | |
| 9,065,791 B2 | 6/2015 | Bosworth et al. | |
| 2004/0172405 A1 | 9/2004 | Farran | |
| 2005/0171955 A1 | 8/2005 | Hull et al. | |
| 2005/0246328 A1 * | 11/2005 | Zhang | G06F 16/9535 |
| 2006/0042483 A1 | 3/2006 | Work et al. | |
| 2006/0048059 A1 | 3/2006 | Etkin | |
| 2006/0085419 A1 | 4/2006 | Rosen | |
| 2006/0143067 A1 | 6/2006 | Calabria | |
| 2006/0200434 A1 | 9/2006 | Flinn et al. | |
| 2006/0218153 A1 | 9/2006 | Voon et al. | |
| 2006/0242581 A1 * | 10/2006 | Manion | G06Q 10/10 715/733 |
| 2006/0282426 A1 | 12/2006 | Spears | |
| 2007/0162458 A1 | 7/2007 | Fasciano | |
| 2008/0005072 A1 | 1/2008 | Meek et al. | |
| 2008/0288612 A1 | 11/2008 | Kwon | |
| 2013/0041921 A1 * | 2/2013 | Cooper | G06F 17/30672 707/780 |
| 2013/0066852 A1 * | 3/2013 | Rose | G06F 17/27 707/722 |

OTHER PUBLICATIONS

Canadian Intellectual Property Office, Office Action, Canadian Patent Application No. 2,660,680, Oct. 16, 2013, four pages.
India Patent Office, First Examination Report, Dec. 19, 2013, Indian Application No. 830/CHENP/2009, two pages.
Canadian Intellectual Property Office, Office Action, Canadian Patent Application No. 2,660,459, May 22, 2013, two pages.
State Intellectual Property Office of the People's Republic of China, Third Office Action, Chinese Patent Application No. 200780034021.2, Jan. 13, 2014, ten pages.
India Patent Office, Examination Report, India Patent Application No. 830/CHEN/2009, May 17, 2014, two pages.
European Patent Office, Summons to attend oral proceedings pursuant to Rule 115(1) EPC, European Patent Application No. 07836589.7, Oct. 9, 2015, five pages.
Canadian Intellectual Property Office, Office Action, Canadian Patent Application No. 2,660,680, Feb. 10, 2015, three pages.
United States Office Action, U.S. Appl. No. 15/204,354, dated Jul. 17, 2017, fifteen pages.
United States Office Action, U.S. Appl. No. 15/204,354, dated Jan. 19, 2018, seventeen pages.
United States Office Action, U.S. Appl. No. 15/204,354, dated Jun. 15, 2018, fifteen pages.
United States Office Action, U.S. Appl. No. 15/204,354, dated Sep. 17, 2018, fourteen pages.
United States Office Action, U.S. Appl. No. 15/204,354, dated Feb. 7, 2019, six pages.

* cited by examiner

FIG. 4

DYNAMICALLY UPDATING MEDIA CONTENT FOR DISPLAY TO A USER OF A SOCIAL NETWORK ENVIRONMENT BASED ON USER INTERACTIONS

CROSS-REFERENCE TO RELATED APPLICATIONS

The present application is a continuation of U.S. application Ser. No. 13/615,253, filed on Sep. 13, 2012, now U.S. Pat. No. 8,412,821, which is a continuation of U.S. application Ser. No. 13/448,157, filed on Apr. 16, 2012, now U.S. Pat. No. 8,312,140, which is a continuation of U.S. application Ser. No. 11/503,037, filed on Aug. 11, 2006, now U.S. Pat. No. 8,171,128, each of which is hereby incorporated by reference in its entirety.

The present application also incorporates by reference the following applications in their entirety: U.S. Application No. 60/750,844, filed on Dec. 14, 2005; U.S. Application No. 60/753,810, filed on Dec. 23, 2005; U.S. application Ser. No. 11/493,291, filed on Jul. 25, 2006; U.S. patent application Ser. No. 11/502,757 filed on Aug. 11, 2006; U.S. patent application Ser. No. 11/503,093, filed on Aug. 11, 2006; and U.S. patent application Ser. No. 11/503,242, filed on Aug. 11, 2006.

BACKGROUND

The present invention relates generally to media presentation, and more particularly to systems and methods for presenting dynamically selected media content to a user of an electronic device in a social network environment.

Conventionally, users of networking websites connect with other users and provide information about themselves. For example, a user may post contact information, background information, current job position, hobbies, and so forth. Other users may contact the posting user based on common interests, or for any other reason.

Recently, social networking websites have developed systems for tailoring connections between various users. For example, users may be grouped based on geographical location, job type, and so forth. Social networking offers users the opportunity for frequent, automatic notification of changes in the information posted by other users.

There are existing mechanisms that allow a user to display information about other users. Some mechanisms may allow the user to select particular items of media content for immediate viewing. Typically, however, these items of media content are disparate and disorganized. In other words, the user must spend time researching a topic by searching for, identifying, and reading individual items of media content that are not presented in a coherent, consolidated manner. Further, often the user remains unaware of the existence of some items of media content that were not captured in the user's research. For example, in a typical social networking environment, one would have to look up another user and click on various links to find information about the other user.

In addition, there are news feeds to which one can subscribe that can provide information on a particular topic via automatic download to an electronic device associated with a user. However, the downloaded information is not selected and presented based on the user's relationships with other users, and does not occur within the context of a social network. What is desired is a way for a user of a social network automatically to receive items of media content that are dynamically selected and presented to the user based on his relationships with other users.

SUMMARY

The present invention provides a system and method for providing dynamically selected media content to a user of an electronic device in a social network environment. Items of media content are selected for the user based on his or her relationships with one or more other users. The user's relationships with other users are reflected in the selected media content and its format. An order may be assigned to the selected items of media content, for example, based on their importance to the user, and the items of media content displayed to the user in that order. The user may change the order of the items of media content. The user's interactions with the items of media content and other items provided by the social network provider are monitored, and those interactions are used to select additional items of media content for the user. In a method according to one embodiment of the invention, the frequency of user interaction with other users and objects on the network is analyzed to identify events, relationships, news items and other objects of interest to the user, and to rank them in importance to the user. The results of this analysis are used to select, consolidate and tailor content for news stories to be presented to the user in a personalized, dynamic news feed that may be more interesting or desirable to the user because of its selection based upon the user's personal relationships.

BRIEF DESCRIPTION OF THE DRAWINGS

FIG. 4 is an exemplary media display screen, such as might be displayed to a user in a social network environment.

DETAILED DESCRIPTION

A system and method is provided for presenting dynamically selected media content to a user of an electronic device in a social network environment. Items of media content are selected for the user based on his or her relationships with one or more other users, with whom the user is associated through a social network provider. The user's relationships with other users are reflected in the selected media content and its format. For example, media content concerning the user's brother, wife, or best friend from college may be presented to the user as being about "your brother," "your wife" and "your best friend from college," respectively. Accordingly, the media content dynamically selected for and presented to the user is personalized in a way that would be less meaningful or interesting if viewed by someone other than the user.

An order is assigned to the selected media content, for example, based on its importance to the user, and the media content is displayed to the user in the assigned order. The user may change the order of the items of media content, for example, via a separate settings display that allows the user to prioritize and/or filter certain items of media content, and/or also by using a "drag-and-drop" function to organize stories dynamically on the media content display. The user's interactions with the media content and other items provided by the social network provider are monitored, and those interactions are used to select additional items of media content for the user. In a method according to one embodiment of the invention, the frequency of user interaction with other users and objects on the network is analyzed to identify events, relationships, news items and other objects of interest to the user, and to rank them in importance to the user as reflected in the descending order of the frequency of the user's interaction with other users. In a display according to such an embodiment, the results of this analysis are used to select, consolidate and tailor content for news stories to be presented to the user in a personalized, dynamic news feed that is more meaningful to the user because of its basis in the user's personal relationships.

Figure 1:
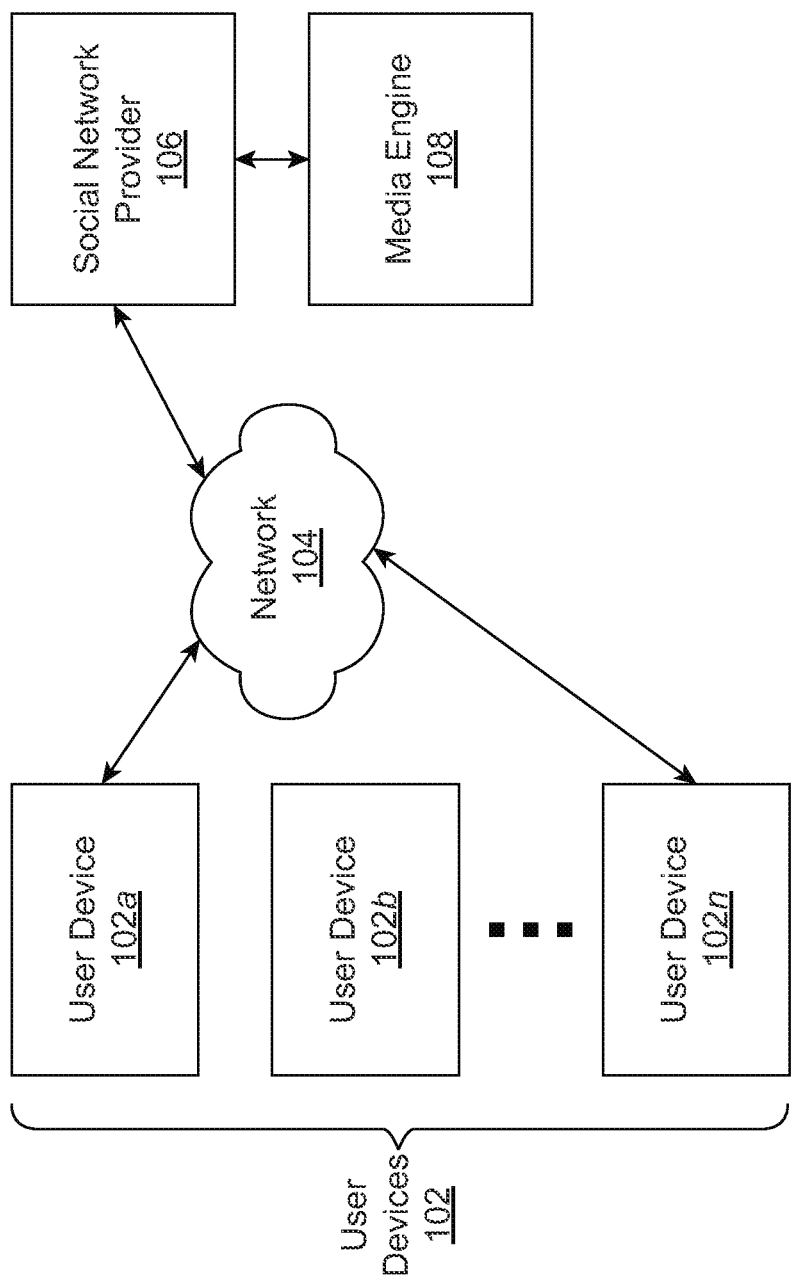
FIG. 1 is a diagram of an exemplary architecture for providing dynamically selected media to a user of an electronic device in a social network environment.

FIG. 1 is a diagram of an exemplary architecture for presenting dynamically selected media to a user of an electronic device in a social network environment. User devices 102, such as a user device 102a, a user device 102b, and a user device 102n, communicate over a network 104 with a social network provider 106. The user devices 102a-102n may comprise any device associated with one or more users, such as a cellular telephone, a personal digital assistant, a desktop or a laptop computer, and so forth. Any types of user devices 102 are within the scope of various embodiments.

The social network provider 106 may comprise any user or entity that provides social networking services, communication services, dating services, and so forth. For example, the social network provider 106 may host a website that allows one or more users at the user devices 102 to communicate with one another via the website. In one instance, the user associated with the user device 102a may communicate with the user associated with the user device 102b via a social networking website associated with the social network provider 106 that offers the user an opportunity to connect or reconnect with one or more other users that attended, for example, the same university as the user.

A media engine 108 is coupled to the social network provider 106. In one embodiment, the media engine 108 can select items of media content based on the user's relationships with other users through the social network provider 106. The media engine 108 analyzes the frequency of the user's interactions with other users through the social network provider 106 and with the selected items of media. The results of this analysis are used to rank the importance of the other users to the user, so that new items of media content are selected and displayed to the user in the order of the content's anticipated importance or interest to the user.

For example, a user at the user device 102a uses a cursor to click on items of media content related to his sister Abby very frequently, and to click on emails from his friend Bob somewhat less frequently. The items of media content selected by the media engine 108 will be dynamically presented to the user at the user device 102a with an importance ranking based on an analysis of the frequencies of the user's interactions with items of media content associated with his friends, so that items of media content associated with Abby will be presented first to the user at the user device 102a, followed by items of media content associated with Bob. For example, the items of media content may be news stories about the other users Abby and Bob. Such news stories would be presented to the user as stories about "your sister" and "your best friend," so that the wording and content of the stories would not be meaningful to someone other than the users.

In an embodiment not shown, the media engine 108 can receive media content preference settings selections from the users at the user devices 102. The media engine 108 can save the media content preference settings to a profile associated with each user. Once the media content preference settings are selected by the user, the media engine 108 can use the media content preference settings to insure that items of media content concerning particular relationships between the user and other users are not displayed to the user.

The users at the user devices 102 can group other users, events or objects according to categories, such as "friends", "school", "geography", "business", and so forth, and select a media content preference setting applicable to an entire category; any type of grouping may be employed by the user and/or the social network provider 106. Further, according to some embodiments, the user may make media content preference settings applicable to individual other users, events or objects. For instance, the user may select media content preference settings for Jane, media content preference settings for John, and/or media content preference settings for groups of users, which may or may not include Jane and John.

Figure 2:
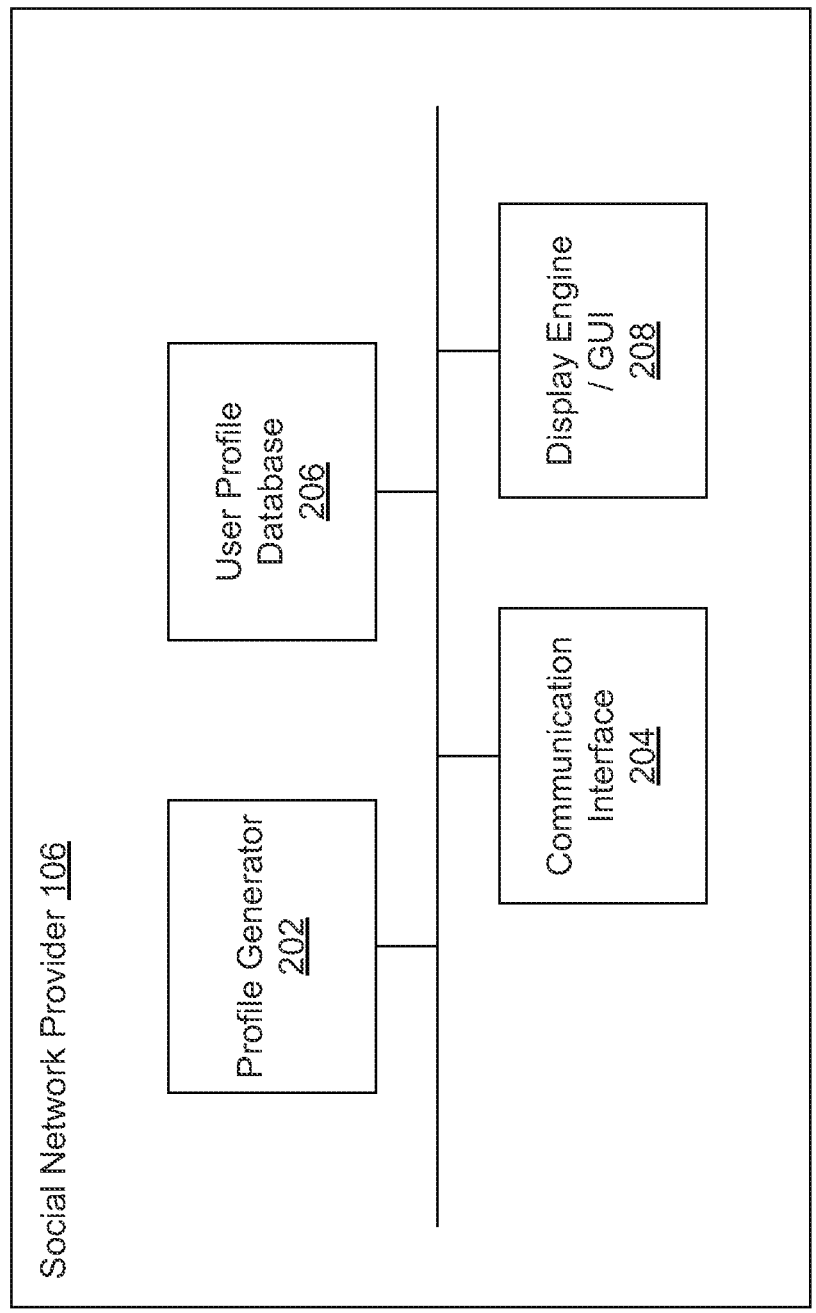
FIG. 2 is a block diagram of an exemplary social network provider.

Referring now to FIG. 2, a block diagram of an exemplary system for providing a social network 106 is illustrated. The social network provider 106 may comprise a server, a client device, or any other device.

The social network provider 106 includes a profile generator 202 for creating the profile for the user, as discussed herein. For example, the user may provide contact information, friends, photos, and so forth to associate with the profile for the user. The profile generator 202 utilizes the information provided by the user to create the profile (i.e., the user profile). As discussed herein, the profile may include one or more categories or subcategories and news priority settings selections may be provided for each of the one or more categories or subcategories.

The social network provider 106 includes a communications interface 204 for communicating with the user devices 102, such as the user devices 102a-102n described herein, over the network 104. The user devices 102 communicate various types of information, such as media content preference settings selections, groupings of other users, and so forth to the social network provider 106 via the communications interface 204. Any type of communications interface 204 is within the scope of various embodiments.

A user profile database 206 is provided for storing data associated with each of the users, such as the users associated with the user devices 102a-102n, in the user profiles created by the profile generator 202. When the users at the user devices 102 select media content preference settings to associate with their user profiles, the user profile database 206 updates the user data associated with each user profile. Accordingly, the media content preference settings selections are stored in association with each user profile. The user profiles and/or the media content preference settings selections may be stored, modified, added, and so forth to any storage medium, according to some embodiments.

A display engine/GUI 208 may also be provided by the social network provider 106. The display engine/GUI 208 displays dynamically selected items of media, the user's profile, and so forth to a user of an electronic device in a social network environment to the users associated with the user devices 102. The users can interact with the social network provider 106 via the display engine/GUI 208. For example, the users can access the dynamically selected items of media, their own user profile, other items of media content available via the social network provider, select media content preference settings, and so forth via the display engine/GUI 208.

Although the social network provider 106 is described as being comprised of various components (the profile generator 202, the communications interface 204, the user profile database 206, and the display engine/GUI 208), fewer or more components may comprise the social network provider 106 and still fall within the scope of various embodiments.

Figure 3:
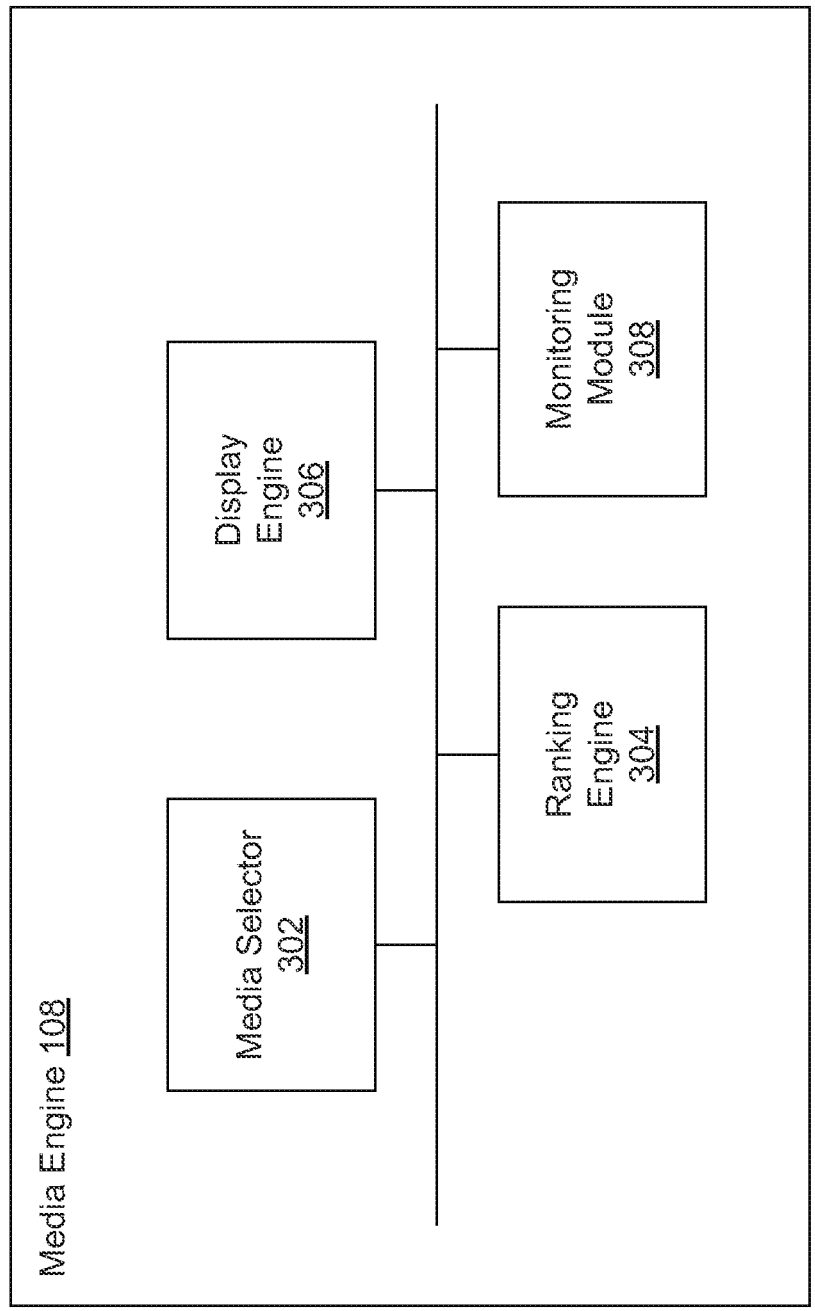
FIG. 3 is a block diagram of an exemplary media engine.

FIG. 3 is a block diagram of an exemplary media engine 108. A media selector 302 gathers items of media content available through the social network provider, consolidates them and prepares them for presentation to the user. For example, the media selector 302 finds four items of media content associated with Abby and six items of media content associated with Bob, arranges them in the order provided by the ranking engine 304, formats them in language intelligible only to the user as discussed above, and presents them to the user via the display engine 306.

For example, in some embodiments the media selector 302 can identify items of media content associated with relationships, events or objects that receive high rankings from the ranking engine 304, locate information related to the items of media content associated with the 20 relationships, events or objects of greatest interest to the user, and consolidate that information into content for personalized, dynamic presentation on those 20 topics.

A ranking engine 304 analyzes the frequency of user actions associated with particular relationships, events and objects, or categories or subcategories of relationships, events or objects made available via the social network provider 106. According to some embodiments, the ranking engine 304 comprises a database or other storage medium that stores user interaction data. Alternatively, the monitoring module 308 comprises a database or other storage medium that stores user interaction data. The ranking engine 304 examines the user interaction data, uses an algorithm to weight the items of media content associated with relationships, events and objects, individually and/or in categories relative to the frequency of user interaction with these items of media. The ranking engine 304 orders the items of media content based on the measured frequencies of user interaction, generating a list of the items of media content reflecting their importance to the user. For example, the items of media content may be arranged in descending order of their importance to the user, in that a highest frequency of user interactions with items of media content associated with a particular relationship results in items of media content pertaining to that relationship being listed first. Alternatively, any algorithm could be used by the ranking engine, to generate other orders for the items of media content on other bases. In some embodiments, the order generated for the items of media content is based on the user affinity described in U.S. application Ser. No. 11/503,093, cited above.

Because user interest may vary over short and long timescales, the weighting may change as a function of time in some embodiments. For example, a user planning a trip may be very interested in news of other users who have traveled recently, in news of trips identified as events by other users, and in travel information, and then be much less interested in these relationships, events, objects, or categories or subcategories thereof upon his return. Thus, items of media content associated with another user who has traveled recently may receive a large weighting relative to other items of media, and the weighting will decay steeply so that the weighting is low by the time of the user's return. Alternatively, the weighting associated with individual relationships, events and objects, or categories or subcategories thereof that are of long-term interest may remain steadily high.

A display engine 306 receives the consolidated, ordered items of media content from the media selector 302 and creates a presentation of personalized, dynamically selected media that may be most meaningful to the user because of its basis in the user's personal relationships. For example, the display engine 306 may personalize a media item topic heading to information about a particular relationship, such as that between the user and his brother, and modify the content of the media item so that it is about "your brother." Any number of such translations may be used to tailor the display to the user based on his relationships with other users. In some embodiments, the presentation of personalized, dynamically selected media that may be most meaningful to the user because of its basis in the user's personal relationships may be formatted by the media selector 302, and forwarded with modifications completed to the display engine 306.

According to some embodiments, the display engine 306 comprises a database or other storage medium that stores translation data, which the display engine 306 accesses in order to create a personalized, dynamic news feed, which immediately informs the user of any new items of media content introduced to the social network environment that may be of interest to the user. The display engine 306 may then forward the news feed to the display engine/GUI 208 for display to the user associated with the particular news feed display. The immediately updated display is discussed in further detail in association with FIG. 4. In some embodiments, the media selector 302 comprises the database or other storage medium that stores translation data. In some embodiments, the display engine/GUI 208 may be identical with the display engine 306.

A monitoring module 308 tracks user interactions with items of media content made available via the social network provider 106 to determine which relationships, events and objects are most interesting to the user by measuring the frequency of the user's interactions with the items of media content available through the social network provider. The frequency of user actions associated with particular relationships, events and objects, or categories or subcategories of relationships, events or objects is recorded. According to some embodiments, the monitoring module 308 comprises a database or other storage medium that stores interaction data, which the ranking engine 304 accesses so that the ranking engine 304 can order the items of media content based on the measured frequencies of user interaction, generating a list of the items of media content reflecting their importance to the user. For example, the monitoring module can count the number of times the user accesses email from his brother, or the number of times the user clicked on dynamically selected items of media content reflecting news about his best friend.

Figure 4:
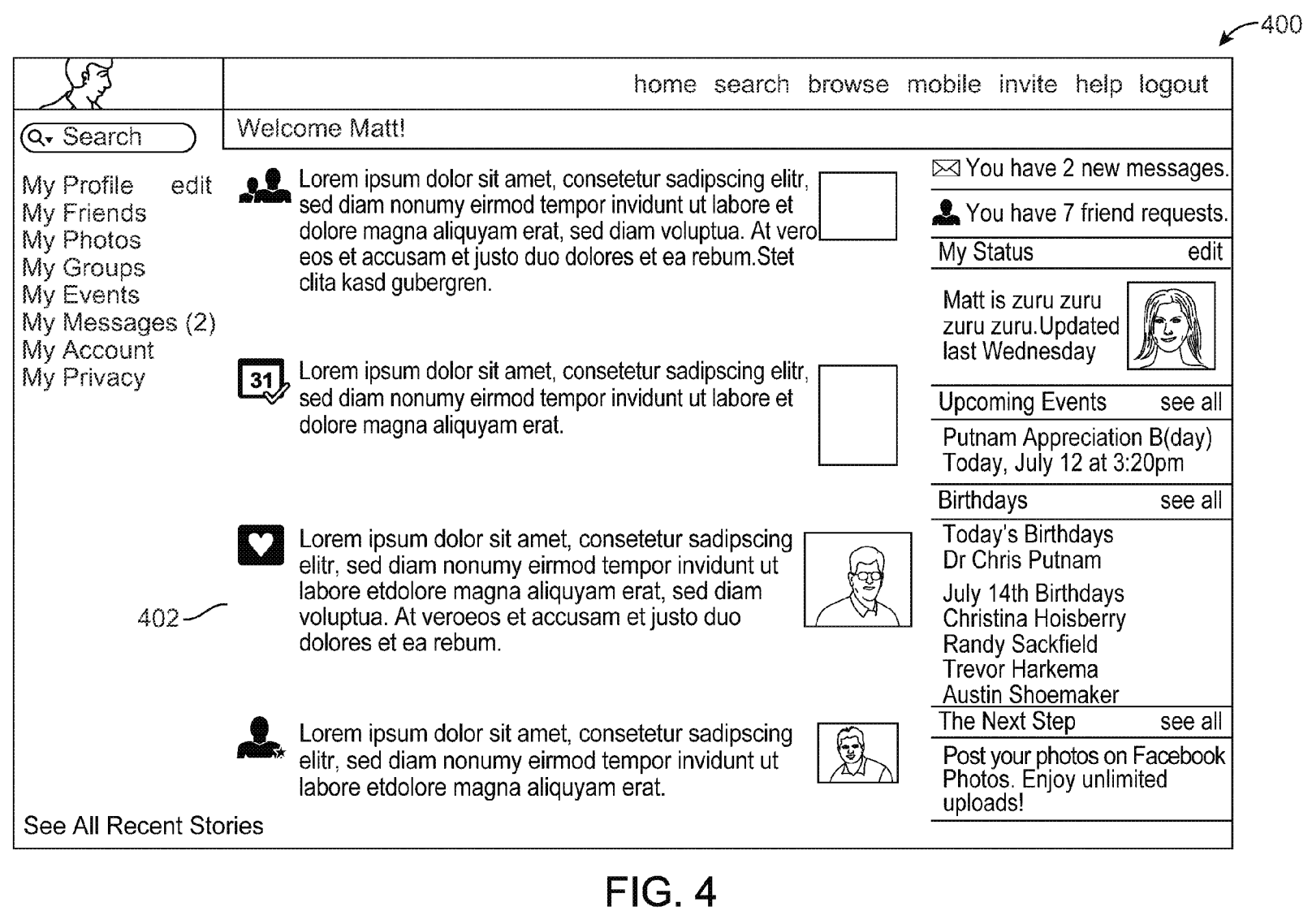

FIG. 4 shows an exemplary presentation screen 400 of dynamically selected media content to a user of an electronic device in a social network environment. As discussed herein, the presentation 400 of personalized, dynamically selected media content utilizes the user action analysis generated by the ranking engine 304 to present news gathered by the media selector 302 and organized by the ranking engine 304 (or alternatively, organized by the media selector 302) to the user in a coherent, up-to-date form for easy comprehension. Further, the news has been processed to minimize redundancy and presented in a narrative form by the media selector 302 or alternatively, by the display engine 306. (In FIG. 4 neither Brittney nor Megan has a special relationship with the user. As discussed herein, if desired, the screen could say, "your sister" for Brittney, or "your best friend" for Megan, for example.)

Four dynamically selected items of media content based on the user's relationships with other users 402 are displayed. In the presentation 400 in FIG. 4, the user's most important relationships are with Megan, Brittney and the group Country Music Listeners. The weighting of user interactions with items of media content associated with these relationships resulted in the item of media reflecting two of these three most important relationships being presented at the top of the display, followed by items of media content (here, news stories) about Megan, then other news stories about Brittney.

As discussed herein, the display engine/GUI 208 may display the presentation 400. Further, as also discussed herein, the user may input selections for various media content preference setting selections associated with one or more relationships associated with items of media content in the social network environment. Accordingly, the user profile database 208 is updated with the user's media content preference setting selections for each relationship. The user interaction analysis and the user profile are utilized by the media selector 302 to create the presentation of personalized, dynamically selected media. The display engine/GUI 306 is then utilized to display the personalized, dynamic news feed to the user, in order to keep the user up to date on relationships, events and objects of interest to the user as indicated by the media content preference setting selections chosen by the user and the analysis selected by the ranking engine 304.

Figure 5:
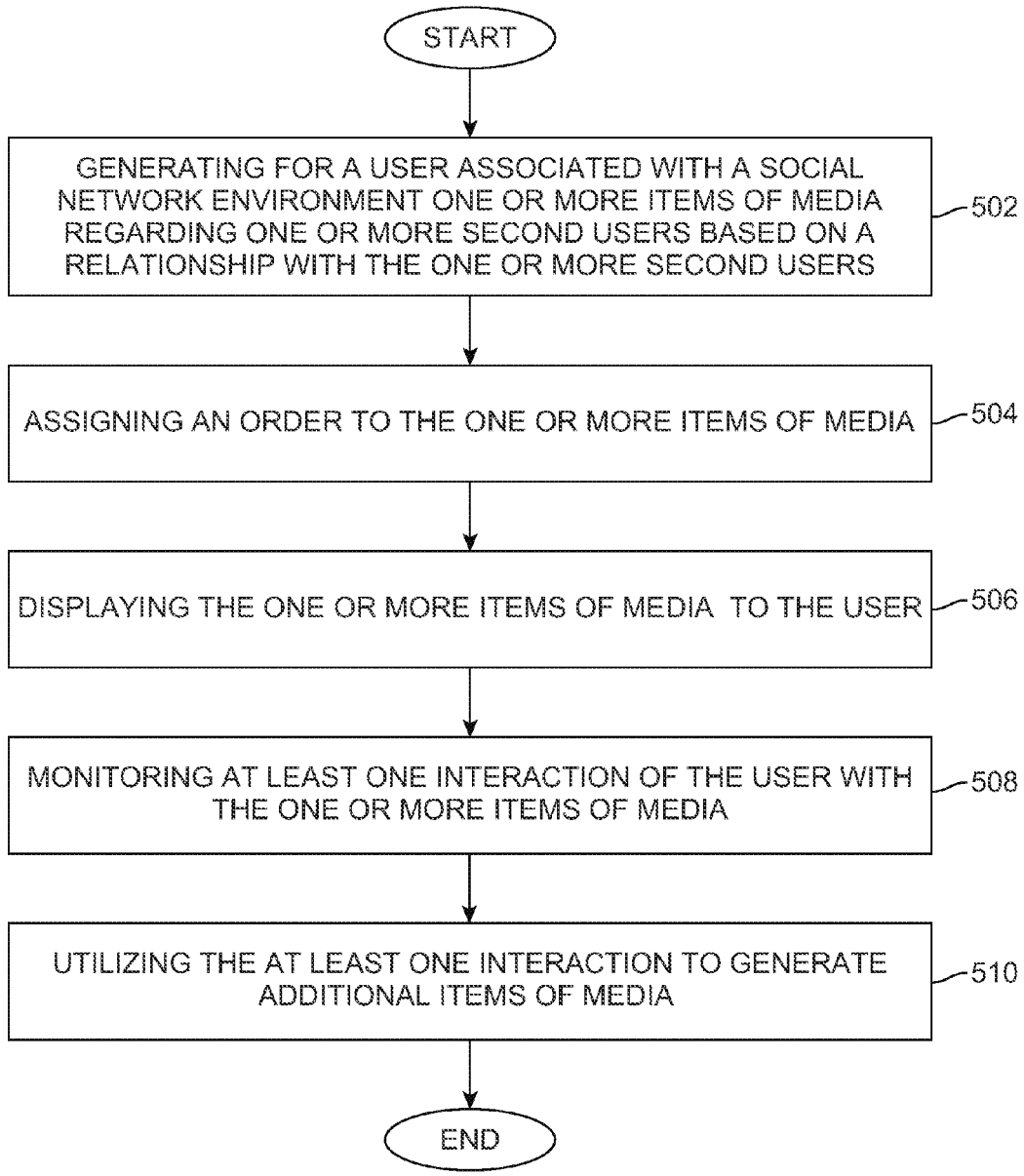
FIG. 5 is a flow chart of an exemplary process for providing dynamically selected media to a user of an electronic device in a social network environment.

FIG. 5 illustrates a flow diagram of an exemplary process for providing dynamically selected media to a user of an electronic device in a social network environment. At step 502 one or more items of media content regarding one or more second users based on a relationship with the one or more second users is selected for a user associated with a social network environment. As discussed herein, the relationship may include relationships with one or more individual users, or relationships with categories of users such as those in a geographical location network, a college network, and so forth. The items of media content may include one or more categories or subcategories, such as photos, event notices, invitations, bulletin board postings, contact information, emails, and so forth.

At step 504, an order is assigned to the one or more items of media content selected for the user. As discussed herein, a user action analysis is generated by tracking user actions and recording the frequencies of those actions with items of media content associated with various relationships, and ranking the various relationships in importance to the user. For example, a user interested in learning about the activities of his favorite group, such as a group of fellow college alumni near a reunion date, may click on items of media content associated with fellow college alumni with high frequency over a few days or weeks. The high-frequency of user action associated with fellow college alumni will result in a rank of high importance to the user for items of media content associated with fellow college alumni. In some embodiments not shown, the user may change the order of the items of media content, for example, via a separate settings display that allows the user to prioritize and/or filter certain items of media content, and/or also by using a "drag-and-drop" function to organize stories dynamically on the media content display.

At step 506 the one or more items of media content are displayed to the user in a consolidated, tailored form based on the order determined by the user interaction analysis. In the example discussed in the preceding paragraph, items of media content associated with fellow college alumni will be presented near the top of the display.

At step 508, at least one interaction of the user with items of media content in the social network environment is monitored. These items of media content may be from those selected by the media selector 302, but may also be any other media content available through the social network provider 106 accessed or viewed by the user. As discussed herein, the monitored frequencies of user interactions with items of media content associated with the user's relationships with other users are provided to the ranking engine to determine the order in which items of media content should be presented to the user.

At step 510, the monitoring of the at least one interaction of the user with items of media content in the social network environment is utilized to select additional items of media content for dynamic presentation to the user. As discussed herein, in some embodiments the ranked items of media content are converted into a news feed display, such as the exemplary presentation 400 illustrated in FIG. 4. The presentation 400 may combine content from the one or more relationships, networks, categories, and/or subcategories into one or more items of media content or categories of items of media.

While various embodiments have been described above, it should be understood that they have been presented by way of example only, and not limitation. For example, any of the elements associated with the dynamically selected media presentation may employ any of the desired functionality set forth hereinabove. Thus, the breadth and scope of a preferred embodiment should not be limited by any of the above-described exemplary embodiments.

Embodiments of this invention may also include a computer readable medium having embodied thereon a program, the program being executable by a processor for performing a method, as described herein, for providing dynamically selected media content to a user of an electronic device in a social network environment

What is claimed is:

1. A computer-implemented method comprising:
   sending a newsfeed including a plurality of news stories to a viewing user of a social network system, the plurality of news stories selected based on preference settings of the viewing user and based on a relationship type between the viewing user and other users of the social network system, wherein at least one selected news story includes information associated with at least one of the other users;
   monitoring one or more interactions between the viewing user of the social network system and the other users of the social network system with whom the viewing user has established a connection;
   determining, from the one or more monitored interactions, a frequency of interactions of the viewing user associated with the other users with whom the viewing user has established a connection;
   obtaining a filtered set of candidate additional news stories associated with at least one of the other users with whom the viewing user has established a connection, the filtered set of candidate additional news stories excluding one or more stories based on the preference settings of the viewing user;

determining a weight for media content included in each candidate additional news story of the filtered set of candidate additional news stories based on the frequency of interactions;

classifying each candidate additional news story of the filtered set of candidate additional news stories based on whether the candidate additional news story is of short-term interest to the viewing user or of long-term interest to the viewing user, the classification performed based at least in part on a frequency of interactions of the viewing user with topics associated with the candidate additional news story;

modifying the weight for the media content included in each candidate additional news story based on a function of time, wherein a weight for a media content included in a candidate additional news story is modified to decrease over time if the candidate additional news story is classified as of short-term interest to the viewing user and wherein the weight for the media content included in the candidate additional news story remains steadily high if the candidate additional news story is classified as of long-term interest to the viewing user;

selecting, from the filtered set of candidate additional news stories, one or more additional news stories for the viewing user based at least in part on the modified weight for the media content included in each candidate additional news story of the filtered set of candidate additional news stories and the preference settings of the viewing user;

updating the newsfeed to include the one or more selected additional news stories, at least one of the additional news stories describing an action taken by at least one of the other users of the social network system with whom the viewing user has established a connection; and sending the updated newsfeed comprising the selected additional news stories to the user device for display to the viewing user.

2. The method of claim 1, wherein a preference setting identifies a relationship type between the viewing user and a specific additional user of the other users with whom the viewing user has established a connection.

3. The method of claim 1, wherein a preference setting identifies a relationship between the viewing user and a subset of the other users with whom the viewing user has established a connection.

4. The method of claim 1, wherein the weight for the media content included in each candidate additional news story is based at least in part on a frequency of the viewing user's actions associated with particular relationships, events, objects, categories of relationships, subcategories of relationships, categories of events, categories of objects, subcategories of events, or subcategories of objects.

5. The method of claim 4, wherein the weight is associated with one or more of the particular relationships, the events, the objects, the categories of relationships, the subcategories of relationships, the categories of events, the categories of objects, the subcategories of events, or the subcategories of objects.

6. The method of claim 1, wherein the monitoring comprises recording the viewing user's actions associated with particular relationships, events, objects, categories of relationships, subcategories of relationships, categories of events, categories of objects, subcategories of events, or subcategories of objects.

7. The method of claim 1, wherein at least one of the monitored one or more interactions is with one or more items of media content contained in a news story selected for the viewing user.

8. The method of claim 1, wherein at least one of the monitored one or more interactions is with one or more items of media content in the social network system outside of a news story that has been previously selected for the viewing user.

9. A computer-implemented method comprising:

sending a newsfeed for display to a viewing user of a social network system, the newsfeed including a plurality of news stories selected based on preference settings of the viewing user and based on a relationship type between the viewing user and other users of the social network system, wherein at least one selected news story includes information associated with at least one of the other users;

monitoring one or more interactions between the viewing user and at least one of: the other users of the social network system and media content in the social network system;

determining, from the one or more monitored interactions, a frequency of interactions of the viewing user associated with at least one of: the other users with whom the viewing user has established a connection and the media content in the social network system;

obtaining a filtered set of candidate additional news stories associated with at least one of the other users with whom the viewing user has established a connection and the media content in the social networking system, the filtered set of candidate additional news stories excluding one or more stories based on the preference settings of the viewing user;

determining a weight for media content included in each candidate additional news story of the filtered set of candidate additional news stories based on the frequency of interactions;

classifying each candidate additional news story of the filtered set of candidate additional news stories based on whether the candidate additional news story is of short-term interest to the viewing user or of long-term interest to the viewing user, the classification performed based at least in part on a frequency of interactions of the viewing user with topics associated with the candidate additional news story;

modifying the weight for the media content included in each candidate additional news story based on a function of time, wherein a weight for a media content included in a candidate additional news story is modified to decrease over time if the candidate additional news story is classified as of short-term interest to the viewing user and wherein the weight for the media content included in the candidate additional news story remains steadily high if the candidate additional news story is classified as of long-term interest to the viewing user;

selecting additional news stories from the filtered set of candidate additional news stories based at least in part on the modified weight for the media content included in each candidate additional news story of the filtered set of candidate additional news stories and the preference settings of the viewing user and other users with whom the viewing user has established a connection associated with the filtered set of candidate additional news stories, at least one of the filtered set of candidate additional news stories including information associated with at least one of the other users of the social network system with whom the viewing user has established a connection;

updating the newsfeed to include the one or more selected additional news stories; and sending the updated newsfeed including the one or more selected additional news stories to the user device for display to the viewing user.

10. The method of claim 9, wherein a preference setting identifies a relationship type between the viewing user and a specific additional user of the other users with whom the viewing user has established a connection.

11. The method of claim 9, wherein a preference setting identifies a relationship between the viewing user and a group of other users of the other users with whom the viewing user has established a connection.

12. The method of claim 9, wherein selecting the additional news stories from the filtered set of candidate additional news stories further comprises:

ranking the candidate additional news stories associated with a relationship type based on the weight for the media content included in each candidate additional news story;

and selecting the additional news stories from the ranked candidate additional news stories.

13. The method of claim 9, wherein selecting the additional news stories from the filtered set of candidate additional news stories further comprises:

ranking the candidate additional news stories associated with the media content based on the weight for the media content included in each candidate additional news story; and selecting the additional news stories from the ranked candidate additional news stories.

14. The method of claim 9, wherein the weight for the media content included in each candidate additional news story is based at least in part on frequencies with which the viewing user interacts with media content associated with other users of the social network system with whom the viewing user has established a connection.

15. The method of claim 9, wherein the monitoring comprises recording the viewing user's actions associated with particular relationships, events, objects, categories of relationships, subcategories of relationships, categories of events, categories of objects, subcategories of events, or subcategories of objects.

16. The method of claim 9, wherein a monitored interaction is with one or more items of media content contained in a news story selected for the viewing user.

17. A computer-implemented method comprising:

sending a newsfeed including a plurality of news stories to a viewing user of a social network system, the plurality of news stories selected based on preference settings of the viewing user and based on a relationship type between the viewing user and other users of the social network system, wherein at least one selected news story includes information associated with at least one of a media content object or one of the other users;

monitoring one or more interactions between the viewing user of the social network system and one or more media content objects in the social network system;

determining, from the one or more monitored interactions, a frequency of interactions of the viewing user associated with the one or more media content objects;

obtaining a filtered set of candidate additional news stories associated with the one or more media content objects, the filtered set of candidate additional news stories excluding one or more stories based on the preference settings of the viewing user;

determining a weight for media content included in each candidate additional news story of the filtered set of candidate additional news stories based on the frequency of interactions;

classifying each candidate additional news story of the filtered set of candidate additional news stories based on whether the candidate additional news story is of short-term interest to the viewing user or of long-term interest to the viewing user, the classification performed based at least in part on a frequency of interactions of the viewing user with topics associated with the candidate additional news story;

modifying the weight for the media content included in each candidate additional news story based on a function of time, wherein a weight for a media content included in a candidate additional news story is modified to decrease over time if the candidate additional news story is classified as of short-term interest to the viewing user and wherein the weight for the media content included in the candidate additional news story remains steadily high if the candidate additional news story is classified as of long-term interest to the viewing user;

selecting, from the filtered set of candidate additional news stories, one or more additional news stories for the viewing user based at least in part on the modified weight for the media content included in each candidate additional news story of the filtered set of candidate additional news stories and the preference settings of the viewing user;

updating the newsfeed to include the one or more selected additional news stories, at least one of the additional news stories describing an action associated with a media content object taken by at least one of the other users of the social network system with whom the viewing user has established a connection; and sending the updated newsfeed comprising the selected additional news stories to the user device for display to the viewing user.

18. The method of claim 17, wherein a preference setting identifies a relationship between the viewing user and a subset of other users with whom the user has established a connection.

* * * * *